United States Patent
Lee et al.

(10) Patent No.: US 11,102,792 B2
(45) Date of Patent: Aug. 24, 2021

(54) METHOD AND APPARATUS FOR DEMODULATING SIGNAL BY USING SUBFRAME COMBINATION IN WIRELESS COMMUNICATION SYSTEM

(71) Applicant: Samsung Electronics Co., Ltd., Suwon-si (KR)

(72) Inventors: Ikbeom Lee, Seongnam-si (KR); Jinwhan Kang, Bucheon-si (KR); Hyuntack Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/500,618

(22) PCT Filed: Apr. 10, 2018

(86) PCT No.: PCT/KR2018/004189
§ 371 (c)(1),
(2) Date: Oct. 3, 2019

(87) PCT Pub. No.: WO2018/190611
PCT Pub. Date: Oct. 18, 2018

(65) Prior Publication Data
US 2020/0196318 A1    Jun. 18, 2020

(30) Foreign Application Priority Data

Apr. 11, 2017 (KR) .................. 10-2017-0046723

(51) Int. Cl.
*H04W 72/08* (2009.01)
*H04L 5/14* (2006.01)
(Continued)

(52) U.S. Cl.
CPC ............. *H04W 72/085* (2013.01); *H04L 5/14* (2013.01); *H04L 25/0202* (2013.01); *H04L 27/14* (2013.01); *H04W 72/044* (2013.01)

(58) Field of Classification Search
CPC ............. H04W 72/085; H04W 72/044; H04W 72/04; H04L 5/14; H04L 25/0202; H04L 27/14; H04L 5/00; H04L 25/02
See application file for complete search history.

(56) References Cited

U.S. PATENT DOCUMENTS

| 2014/0254512 A1 | 9/2014 | Ron et al. |
| 2015/0326360 A1 | 11/2015 | Malladi et al. |

(Continued)

FOREIGN PATENT DOCUMENTS

| EP | 3300287 A1 * | 3/2018 | ........... H04L 5/0082 |
| WO | 2016/163857 A1 | 10/2016 | |

OTHER PUBLICATIONS

"3rd Generation Partnership Project; Technical Specification Group Radio Access Network; Evolved Universal Terrestrial Radio Access; Medium Access Control protocol specification (Release 14)", 3GPP TS 36.321 V14.2.0 (Mar. 2017) (Year: 2017).*
Ericsson, 'On system acquisition time reduction', R1-1705188, 3GPP TSG RAN WG1 Meeting #88bis, Mar. 24, 2017, Spokane, Washington, USA.

(Continued)

*Primary Examiner* — Walter J Divito
(74) *Attorney, Agent, or Firm* — Jefferson IP Law, LLP (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, (Continued)

smart building, smart city, smart car, connected car, health care, digital education, smart retail, security and safety services.

A method, by which a base station demodulates a signal in a wireless communication system, according to an embodiment of the present invention, comprises: a step for allowing the base station to receive at least one subframe through at least one antenna from a terminal; a step for allowing the base station to combine the subframe including the continuously same data as much as the predetermined number of data; and a step for demodulating the received subframe on the basis of the combined subframe.

12 Claims, 11 Drawing Sheets

(51) Int. Cl.
*H04L 25/02* (2006.01)
*H04L 27/14* (2006.01)
*H04W 72/04* (2009.01)

(56) References Cited

U.S. PATENT DOCUMENTS

| | | | |
|---|---|---|---|
| 2016/0135058 A1* | 5/2016 | Chen | H04W 76/40 370/329 |
| 2016/0330633 A1 | 11/2016 | You et al. | |
| 2017/0041105 A1 | 2/2017 | Yamamoto et al. | |
| 2017/0373810 A1* | 12/2017 | Wang | H04L 5/0053 |
| 2018/0083803 A1 | 3/2018 | Lee et al. | |
| 2020/0022125 A1* | 1/2020 | Li | H04L 5/0005 |

OTHER PUBLICATIONS

Riikka Susitaival et al., "LTE Coverage Improvement by TTI Bundling",VTC Spring 2009, IEEE 69th Vehicular Technology Conference, pp. 1-5, XP055196517, DOI: 10.1109/VETECS.2009. 5073660, Apr. 1, 2009 (Apr. 1, 2009).

Extended European Search Report dated Feb. 28, 2020, issued in European Patent Application No. 18784547.4.

\* cited by examiner

METHOD AND APPARATUS FOR DEMODULATING SIGNAL BY USING SUBFRAME COMBINATION IN WIRELESS COMMUNICATION SYSTEM

TECHNICAL FIELD

The disclosure relates to a signal demodulation method and apparatus using subframe combination in a wireless communication system and, more particularly, to a method and apparatus in which a base station combines and demodulates subframes including the same data in an LTE system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A plurality of terminals are mixed in a time domain of an LTE system. In order to distinguish each terminal, after fast Fourier transform (FFT), signals are accumulated for certain time transmission intervals (TTI) with respect to a region to which a corresponding terminal is allocated in a frequency domain, and channel estimation and signal demodulation process for the accumulated signals are then performed.

DISCLOSURE OF INVENTION

Technical Problem

As described above, in a case where a channel estimation and signal demodulation process are performed on signals accumulated for certain TTIs, deterioration may not occur if a channel value is maintained for the certain TTIs in the accumulation process. However, if a channel value is changed for the certain TTIs, deterioration will occur in the accumulation process. In addition, deterioration may also occur in an accumulation process if a simple accumulation is performed for certain TTIs in the case of frequency offset. Accordingly, in order to solve such a problem, the disclosure provides a method and apparatus for demodulating a signal by combining subframes for certain TTIs.

Solution to Problem

A method for signal demodulation by a base station in a wireless communication system according to an embodiment of the disclosure includes: receiving at least one subframe through at least one antenna from a terminal by a base station; combining a pre-configured number of subframes including the same consecutive data, by the base station; and demodulating received subframes, based on the combined subframes.

A base station in a wireless communication system includes: a base station antenna configured to receive at least one subframe from a terminal; a base station combiner configured to combine a pre-configured number of subframes including the same consecutive data; and a base station demodulator configured to demodulate the received subframes based on the combined subframes.

A method for signal reception by a terminal in a wireless communication system includes: transmitting, by a terminal, at least one subframe to a base station; and receiving a signal transmitted by the base station, based on a demodulated subframe obtained by combining a pre-configured number of subframes including the same consecutive data from the transmitted subframe.

A terminal in a wireless communication system includes: a terminal transmitting unit configured to transmit at least one subframe to a base station; and a terminal receiving unit configured to receive a signal transmitted by the base station, based on a demodulated signal obtained by combining a pre-configured number of subframes including the same consecutive data from the transmitted subframe.

Advantageous Effects of Invention

According to the disclosure, channel estimation is performed on each subframe and subframes are combined by using estimated channels of a plurality of consecutive subframes. Therefore, the disclosure can prevent performance deterioration and enables signal demodulation even in a low signal-to-noise ratio environment, differently from a conventional method in which channel estimation is performed after subframes are accumulated for certain TTIs.

MODE FOR THE INVENTION

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Figure 1:
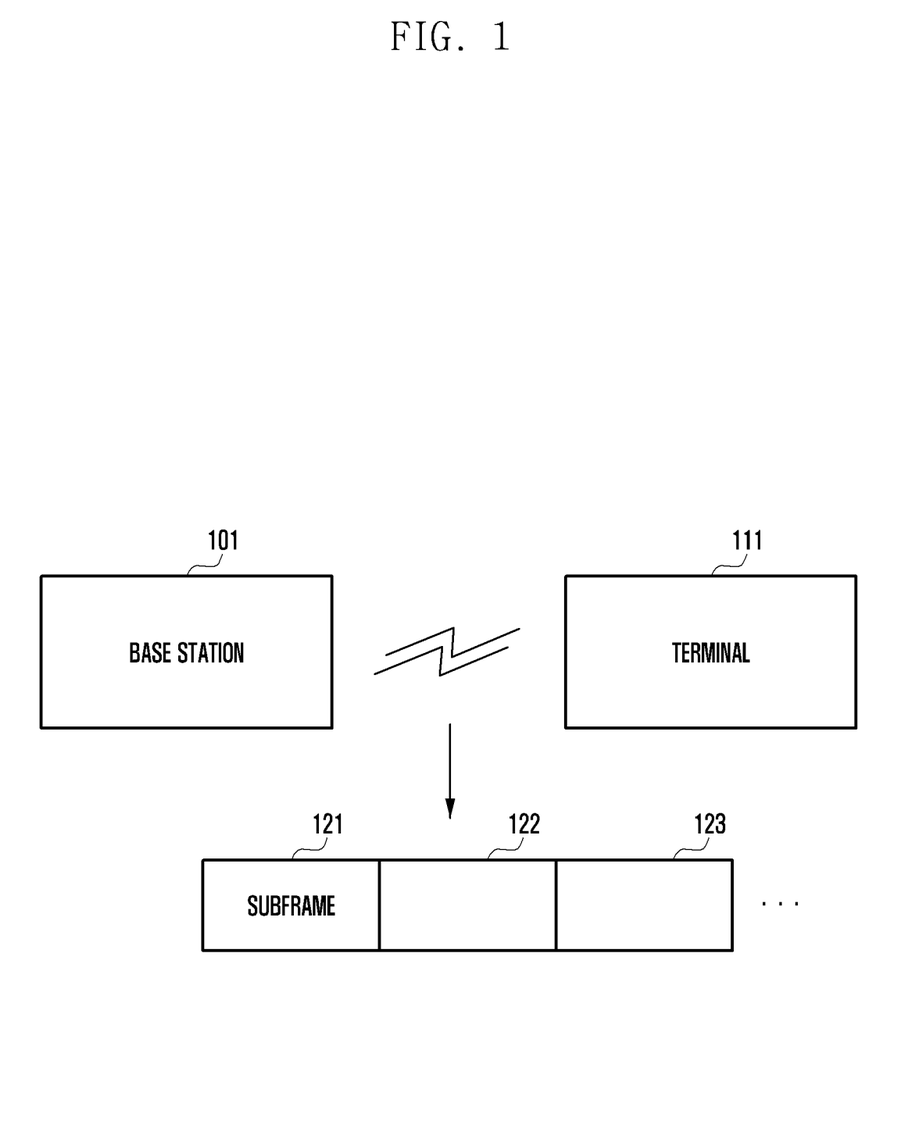
FIG. 1 illustrates a subframe transmission structure between a base station and a terminal in a wireless communication system.

FIG. 1 illustrates a structure for subframe transmission between a base station and a terminal in a wireless communication system.

A base station 101 and a terminal 111 transmit or receive a signal through at least one subframe 121, 122, or 123. Each subframe may include not only data to be transmitted but also control information necessary for receiving the data, information for estimating a channel between a base station and a terminal, and the like.

In addition, the subframes 121, 122, and 123 may include the same data. The disclosure provides a method for signal demodulation by a base station in a case where a certain number of subframes transmitted to a base station from a terminal include the same data. A signal analysis method of a base station will be described in detail with reference to FIG. 2.

Figure 2:
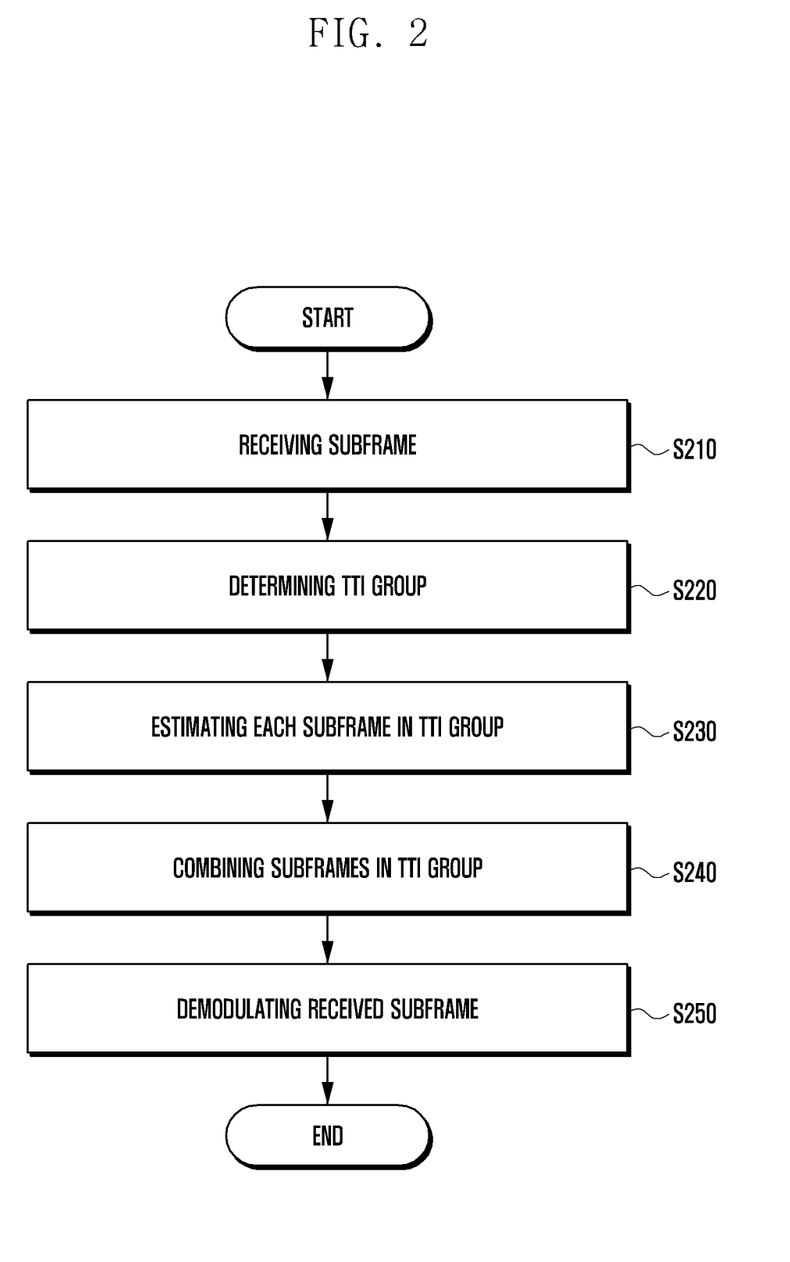
FIG. 2 is a flowchart showing a base station signal demodulation method in a wireless communication system according to an embodiment of the disclosure.

FIG. 2 is a flowchart showing a base station signal demodulation method in a wireless communication system according to an embodiment of the disclosure.

First, in operation S210, a base station receives at least one subframe from a terminal through at least one antenna.

Then, in operation S220, the base station determines a time transmission interval (TTI) group through which subframes including the same consecutive data are received, based on a communication scheme between the base station and the terminal. The TTI group may include a plurality of consecutive subframes. The number of the consecutive subframes may be determined according to a communication scheme. The communication scheme may be determined from the time of terminal manufacture or may be semi-statically determined according to a configuration of a base station (e.g., RRC configuration).

As described above with reference to FIG. 1, the disclosure relates to a signal demodulation method in a case where subframes including the same data are received. Thus, a TTI group through which subframes including the same consecutive data are received is determined by a base station in operation S220.

One TTI is an interval in which one subframe is received. For example, if six subframes include the same consecutive data, a TTI group to be determined in operation S220 may include six TTIs.

Figure 3:
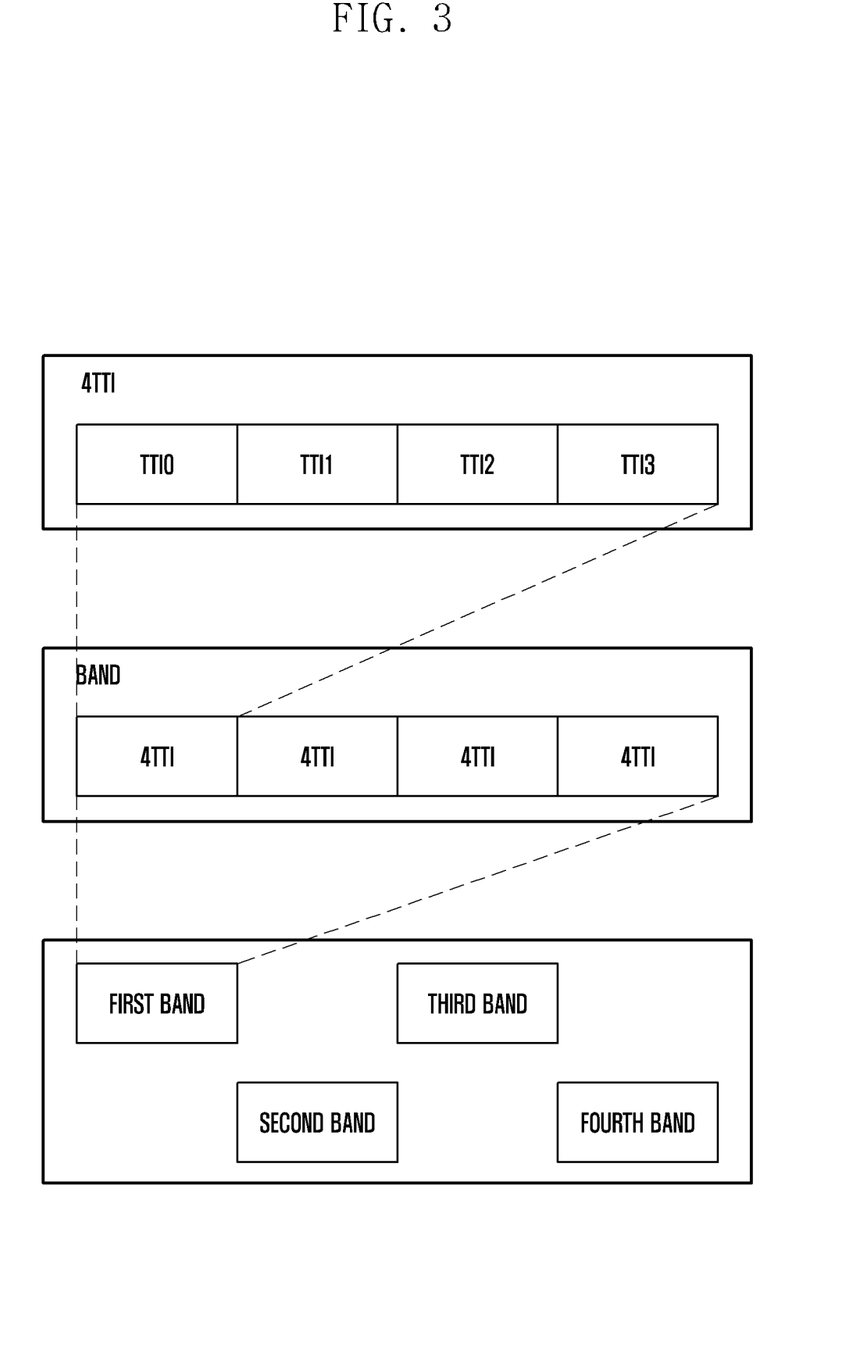
FIG. 3 illustrates a configuration of subframes in a case in which a communication scheme between a base station and a terminal is FFD.
Figure 4:
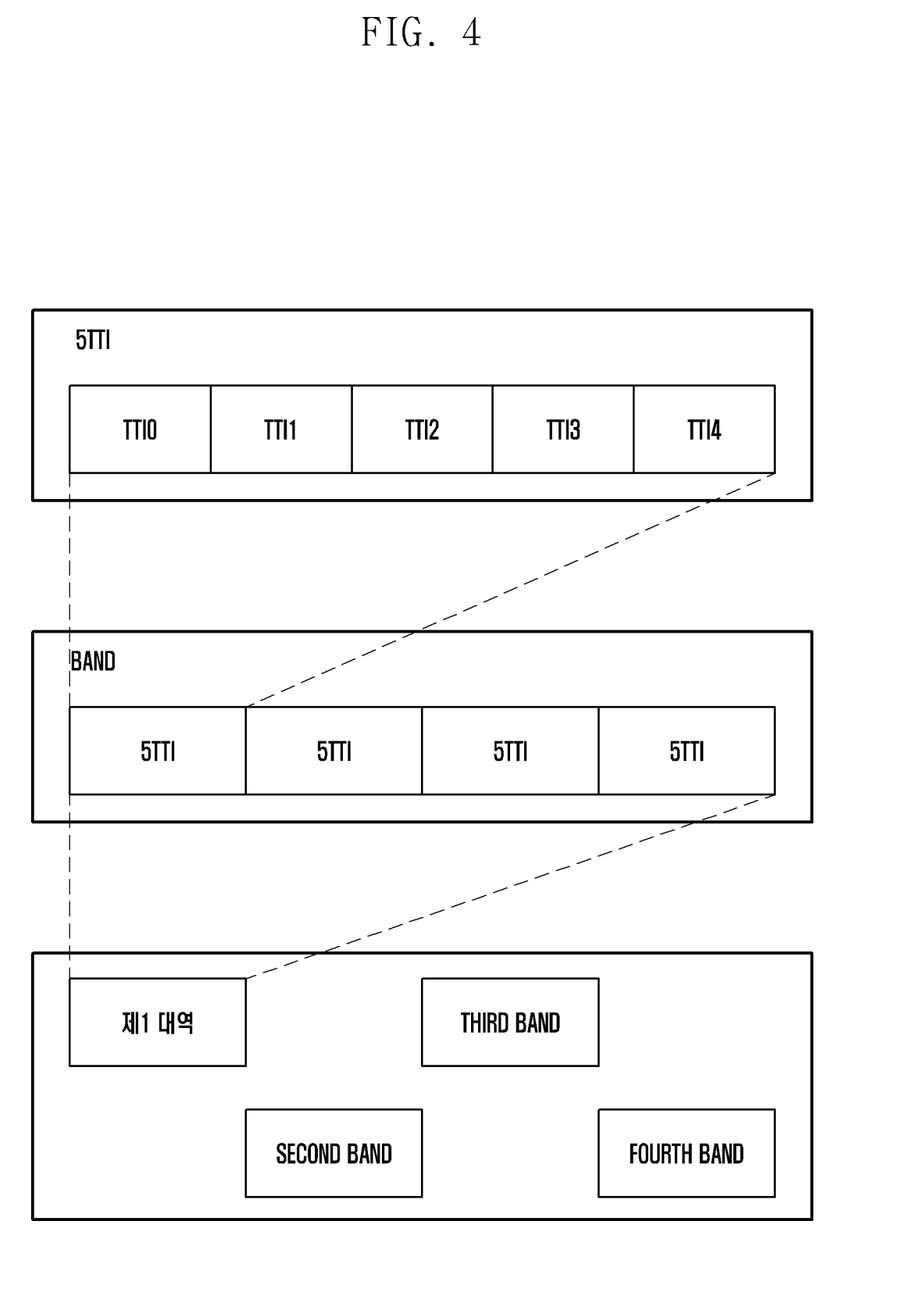
FIG. 4 illustrates a configuration of subframes in a case in which a communication scheme between a base station and a terminal is TDD.

A TTI group may be determined based on a communication scheme between a base station and a terminal in operation S220. FIGS. 3 and 4, for example, illustrate TTI groups which are determined in the case where a communication scheme between a base station and a terminal is frequency division duplex (FFD) and in the case in which the communication scheme is time division duplex (TDD), respectively.

FIG. 3 illustrates a configuration of subframes in a case in which a communication scheme between a base station and a terminal is FFD.

Referring to FIG. 3, if a communication scheme between a base station and a terminal is FDD, four TTIs are determined as a TTI group described in the disclosure. A plurality of TTI groups may be included in one band. In addition, as illustrated in FIG. 3, four TTI groups may be included in one band, and each band may be hopped by changing an operating frequency and thus may exist in various forms.

FIG. 4 illustrates a configuration of subframes in a case in which a communication scheme between a base station and a terminal is TDD.

Referring to FIG. 4, if a communication between a base station and a terminal is TTD, five TTIs are determined as a TTI group. FIG. 4 also illustrates a case in which four TTI groups are included in one band, like the case of FIG. 3.

For convenience, the following description of the disclosure is based on assumption that a communication scheme between a base station and a terminal is FDD. However, the scope of the disclosure should not be construed as being limited to a case in which a communication scheme between a base station and a terminal is FDD, and the scope of the disclosure may be applied not only to a case in which a communication scheme between a base station and a terminal is TDD but also to a case in which a base station receives subframes including the same consecutive data.

After a TTI group is determined by such a method as described above, a channel of each subframe included in the TTI group determined by a base station is estimated in operation S230. A sequence of sub-operation of a method for estimating a channel of each subframe in a TTI group in operation S230 will be described in detail with reference to FIG. 5.

Figure 5:
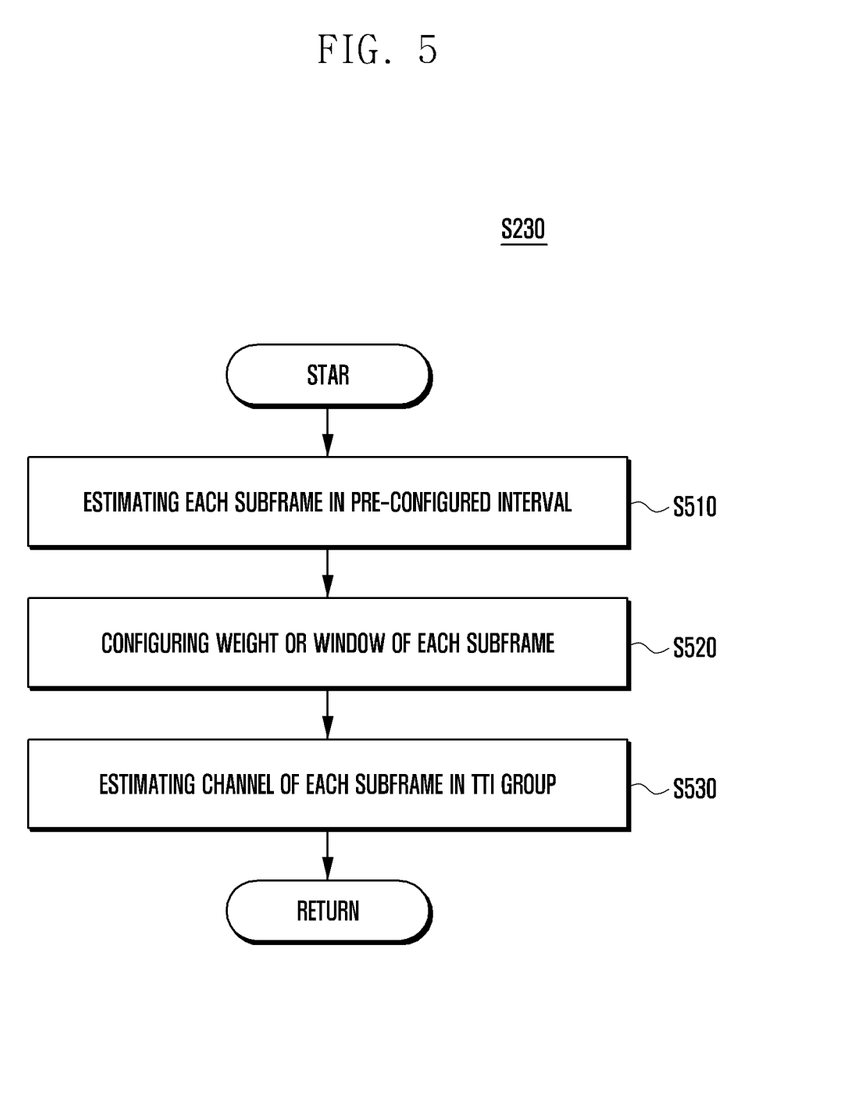
FIG. 5 is a flowchart showing a method for estimating a channel of each subframe in a TTI group according to an embodiment of the disclosure.

First, a channel of each subframe received in a pre-configured interval is estimated by a base station in operation S510. The pre-configured interval means TTI in the same band and means one band illustrated in FIGS. 3 and 4 described above.

Therefore, considering the subframe configurations in FIGS. 3 and 4, a pre-configured interval described in the disclosure may be determined by equation 1 below, $$X = N_R * Z * N_{hop},\qquad \text{Equation 1}$$

wherein X indicates a pre-configured interval, $N_R$ indicates the number of base station antennas, Z indicates a TTI group, and $N_{hop}$ indicates the number of TTI groups allocated in the same band.

For example, as illustrated in FIG. 3, if a communication scheme between a base station and a terminal is FDD, four TTI groups are included in the same band, and the number of antennas provided in the base station is two, a pre-configured interval (X) according to the disclosure includes 32 TTIs (X=2*(4 TTIs)*4=32 TTIs).

If a pre-configured interval determined by equation 1 above includes 32 TTIs, channels of 32 subframes included in 32 TTIs will be estimated in operation S510.

A weight or window of a channel of each subframe received in the pre-configured interval is configured in operation S520, based on a signal-to-noise ratio (SNR) of a channel of each subframe received in the pre-configured interval.

Even subframes in the same band may have different channel values. Thus, a window or weight of a channel is configured based on a signal-to-noise ratio of a channel of each subframe.

For example, a weight of a subframe in a good channel state is configured to be higher than that of other subframes, or a window may be configured around a subframe in a good channel state.

Thereafter, a channel of each subframe in the TTI group is estimated in operation S530, based on a weight or window of a channel of each subframe received in the pre-configured interval.

As mentioned above, in the prior art, channel estimation is performed on accumulated subframes including the same data after subframes are accumulated for certain TTIs without channel estimation of each of the subframes. As a result, performance deterioration inevitably occurs in the process of accumulating subframes.

However, according to the disclosure, channel estimation is performed on every subframe on an assumption that subframes have been received through separate virtual antennas, respectively. Therefore, there is no performance deterioration due to the same reason as in the prior art, and the channel estimation can be freely performed within a TTI group even in a case of a low signal-to-noise ratio.

Referring again to FIG. 2 after operation S230 is performed according to the sequence shown in FIG. 5, subframes in a TTI group are combined in operation S240 of FIG. 2.

Since all subframes in a TTI group include the same data, a base station can accurately demodulate a signal transmitted from a terminal by properly combining the subframes in operation S240.

Figure 6:
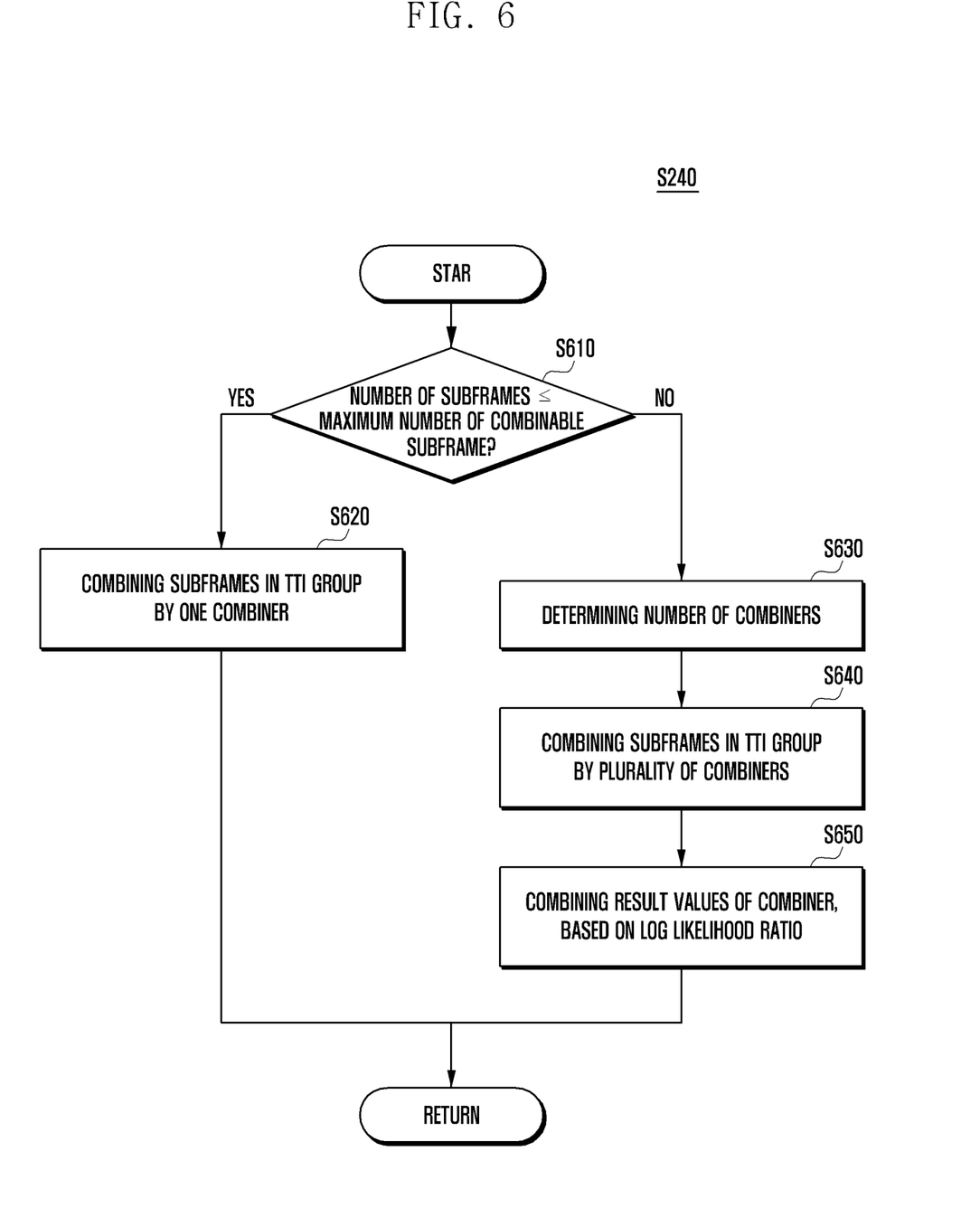
FIG. 6 is a flowchart showing a method for combining subframes in a TTI group according to an embodiment of the disclosure.

A method for combining subframes in a TTI group is shown in FIG. 6. A sequence of sub-operations in operation S240 will be described in detail with reference to FIG. 6.

Referring to FIG. 6, the number of subframes in a TTI group determined in operation S220 is firstly compared with the maximum number of subframes combinable by a combiner in operation S610. The maximum number of combinable subframes may depend on performance of the combiner. For example, the better the hardware performance of a combiner, the larger the maximum number of combinable subframes.

The number of combiners for combining subframes is determined in operation S610. Thus, the number of subframes in a TTI group is firstly compared with the maximum number of subframes combinable by a combiner before subframes are combined. The maximum number of combinable subframes may have various values according to the type of a combiner.

As a result of the comparison in operation S610, if the number of subframes is equal to or less than the maximum number of subframes combinable by a combiner, the subframes in a TTI group are combined by one combiner in operation S620, as shown in FIG. 6.

Figure 7:
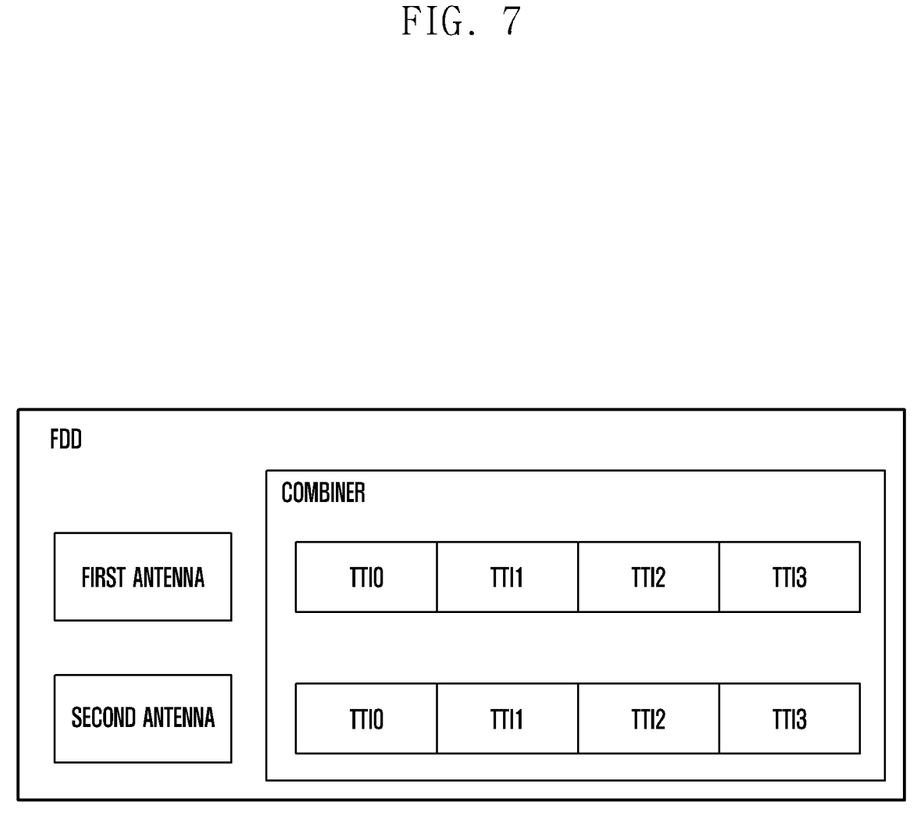
FIGS. 7 and 8 show one embodiment of a configuration of subframes in a TTI group in a case in which a communication scheme between a base station and a terminal is FDD.

FIG. 7 illustrates an example of a configuration of subframes combined by a combiner in the case of operation S620.

FIG. 7 shows a configuration in the case where a communication scheme between a base station and a terminal is FDD, two antennas are arranged in the base station, and the maximum number of subframes combinable by a combiner is eight. That is, the number of subframes in a TTI group is eight, and thus the number of subframes and the maximum number of combinable subframes are the same. Accordingly, the subframes are combined by one combiner according to operation S620.

Therefore, in the case where subframes received by a base station have such a configuration as in FIG. 7, each channel of subframes TTI0, TTI1, TTI2, and TTI3 received through a first antenna and subframes TTI0, TTI1, TTI2, and TTI3 received through a second antenna is estimated, and the subframes are combined by one combiner, based on the estimated channel of each subframe.

Meanwhile, a case in which the number of subframes exceeds the maximum number of combinable subframes may occur in operation S610. In this case, the subframes cannot be combined by only one combiner and thus require a plurality of combiners.

Therefore, as shown in FIG. 6, the number of necessary combiners is determined in operation S630, based on the number of subframes and the maximum number of subframes combinable by a combiner.

There may exist various methods for determining the number of combiners. Those methods may include a method for determining the number of combiners, based on a value obtained by dividing, by the maximum number of subframes combinable by a combiner, a value obtained by multiplying the number of antennas arranged in a base station by the number of subframes existing in one TTI group.

For example, if the number of antennas arranged in a base station is three, the number of subframes existing in one TTI group is five, and the maximum number of subframes combinable by a combiner are six, a value of 2.5 (3*5/6=2.5) is obtained by the method. Thus, three combiners are required in this case.

Once the number of necessary combiners is determined, the subframes in a TTI group are combined in operation S640 by a plurality of combiners determined by a base station, and then the result values obtained by the combining by the plurality of combiners are combined once again in operation S650, based on a log likelihood ratio (LLR).

Figure 8:
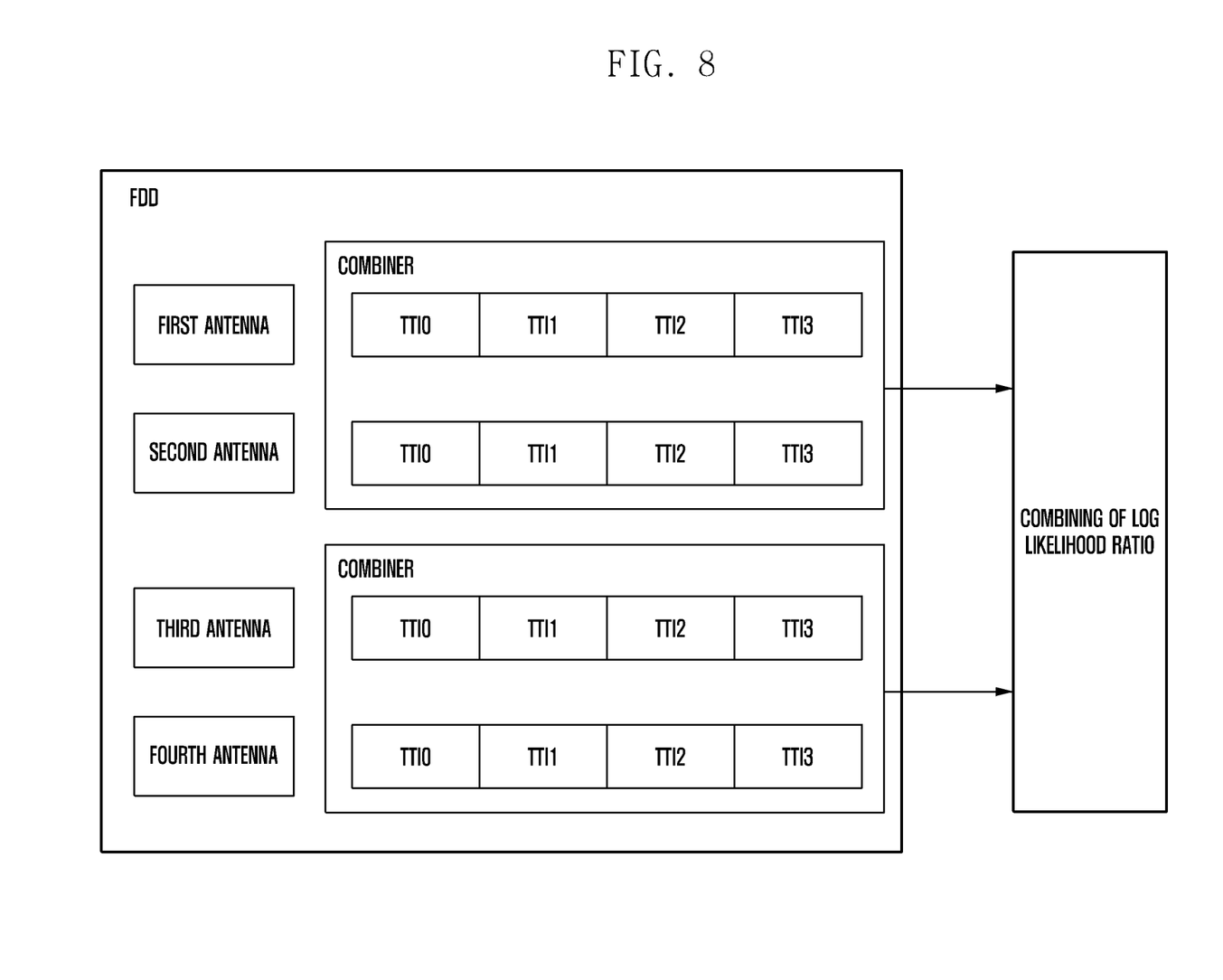

FIG. 8 illustrates an example of a configuration of subframes combined in operation S640 and operation S650.

FIG. 8 shows a configuration in the case where a communication scheme between a base station and a terminal is FDD, four antennas are arranged in the base station, and the maximum number of subframes combinable by a combiner is eight. That is, the number of subframes in a TTI group is sixteen and it has been accordingly determined that two combiners are required.

Therefore, in this case, the subframes (TTI0, TTI1, TTI2, and TTI3) received through a first antenna and a second antenna are combined by one combiner and the subframes received through a third antenna and a fourth antenna are combined by another combiner, in operation S640.

As described above, result values combined by each combiner are combined based on a log likelihood ratio in operation S650, and a base station may perform subframe demodulation, based on a result value obtained by combining a log likelihood ratio.

After operation S240 is performed according to a flowchart shown in FIG. 6, operation S250 is performed as illustrated in FIG. 2, whereby a base station according to the disclosure can demodulate a subframe received from a terminal, without performance deterioration.

In addition, according to the disclosure, an operation of estimating a channel of each subframe and an operation of combining subframes are independently performed, thereby reducing performance deterioration due to accumulation of frequency offset.

Figure 9:
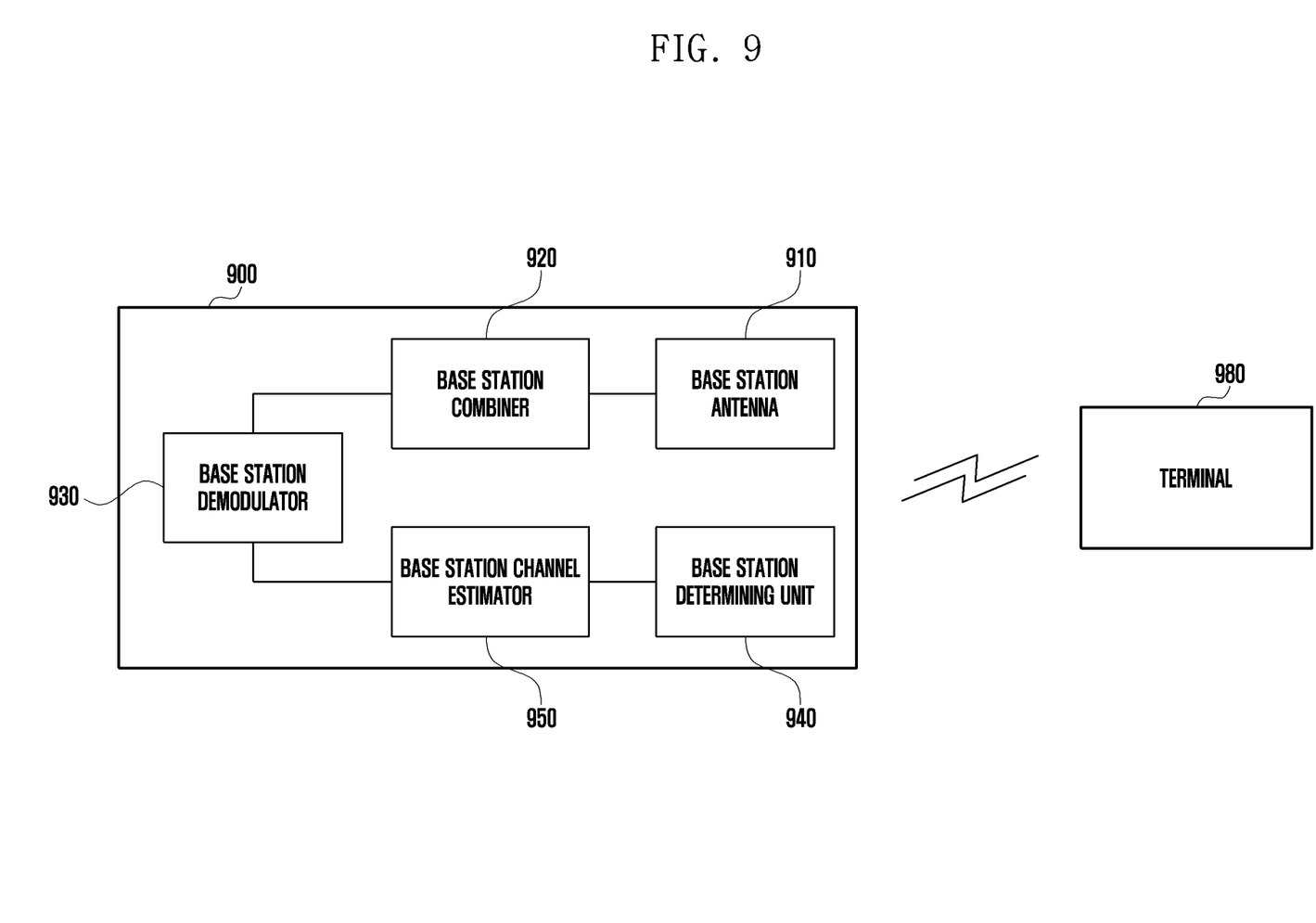
FIG. 9 illustrates a block diagram of a base station in a wireless communication system according to an embodiment of the disclosure.

FIG. 9 illustrates a block diagram of a base station in a wireless communication system according to an embodiment of the disclosure.

A base station 900 according to the disclosure includes: a base station antenna 910 configured to receive at least one subframe from a terminal 980; a base station combiner 920 configured to combine a pre-configured number of subframes including the same consecutive data; a base station demodulator 930 configured to demodulate the received subframes, based on the combined subframes; a base station determining unit 940 configured to determine a time transmission interval (TTI) group through which subframes including the same consecutive data are received, based on a communication scheme between the base station (900) and the terminal (980); and a base station channel estimator 950 configured to estimate a channel of each subframe in the TTI group.

The base station combiner 920 may combine subframes in the TTI group, based on a channel of each subframe, estimated by the base station channel estimator 950.

The base station determining unit 940 may determine four TTIs as a TTI group if a communication scheme between the base station 900 and the terminal 980 is frequency division duplex (FDD), and may determine five TTIs as a TTI group if a communication scheme between the base station 900 and the terminal 980 is time division duplex (TDD).

The base station channel estimator 950 may estimate a channel of each subframe received in a pre-configured interval by the base station antenna, configure a weight or window of a channel of each subframe received in the pre-configured interval, based on a signal-to-noise ratio (SNR) of a channel of each subframe received in the pre-configured interval, and estimate a channel of each subframe in the TTI group, based on a weight or window of a channel of each subframe received in the pre-configured interval.

The pre-configured interval may be determined by equation 2 below, $$X = N_R * Z * N_{hop}, \quad \text{Equation 2}$$

wherein X indicates a pre-configured interval, $N_R$ indicates the number of base station antenna, Z indicates a TTI group, and $N_{hop}$ indicates the number of TTI groups allocated in the same band.

The base station combiner 920 may compare the number of subframes in the TTI group and the maximum number of subframes combinable by a combiner, and combine the subframes in the TTI group by one combiner if the number of the subframes is equal to or less than the maximum number of combinable subframes.

The base station combiner 920 may compare the number of subframes in the TTI group and the maximum number of subframes combinable by a combiner, determine the number of necessary combiners, based on based on the number of subframes and the maximum number of combinable subframes if the number of the subframes exceeds the maximum number of combinable subframes, combine the subframes in the TTI group by the plurality of determined combiners, and combine result values obtained by the combining by the plurality of combiners, based on a log likelihood ratio (LLR).

Figure 10:
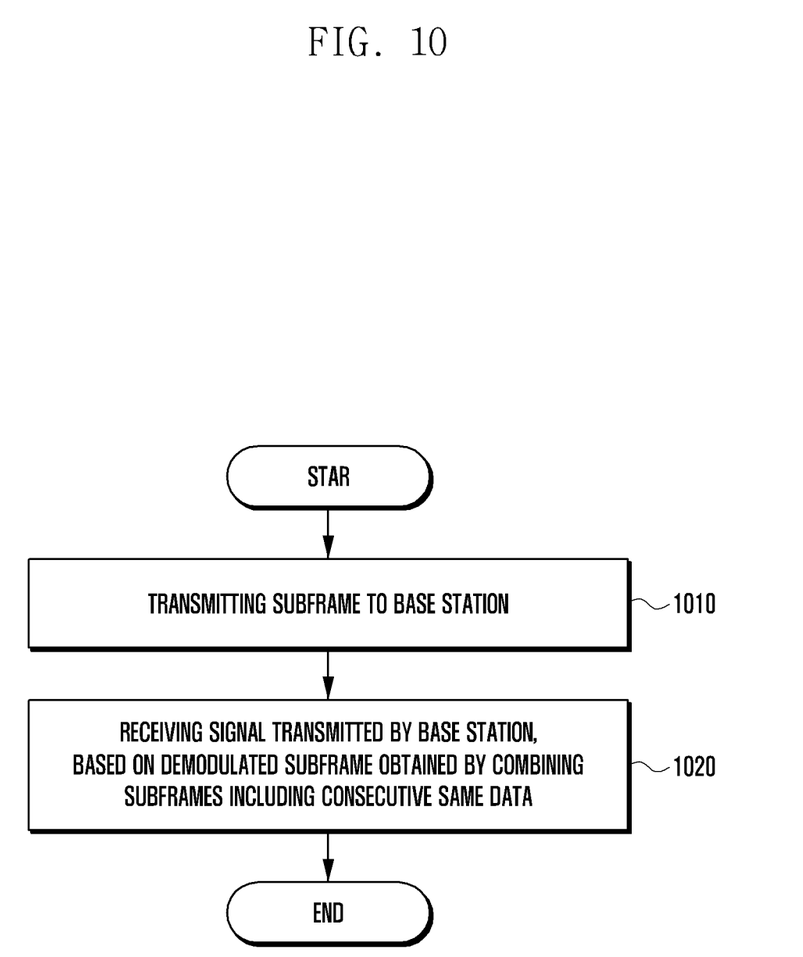
FIG. 10 is a flowchart showing a method for signal reception by a terminal in a wireless communication system according to an embodiment of the disclosure.

FIG. 10 is a flowchart showing a method for signal reception by a terminal in a wireless communication system according to an embodiment of the disclosure.

A method for signal reception by a terminal in a wireless communication system according to the disclosure includes: transmitting at least one subframe to a base station by a terminal, in operation S1010; and then receiving, in operation S1020, a signal transmitted by the base station, based on a demodulated subframe obtained by combining a pre-configured number of subframes including the same consecutive data from the transmitted subframe.

The combining of the subframes may be performed based on an estimated channel of each subframe in a time transmission interval (TTI) group through which subframes including the same consecutive data are received, determined based on a communication scheme between the base station and the terminal.

The TTI group may be determined to include four TTIs if a communication scheme between the base station and the terminal is frequency division duplex (FDD), and may be determined to include five TTIs if a communication scheme between the base station and the terminal is time division duplex (TDD).

In addition, a channel of each subframe in the TTI group may be estimated by a weight or window of a channel of each subframe, configured based on a signal-to-noise ratio of a channel of each subframe received in a pre-configured interval.

Figure 11:
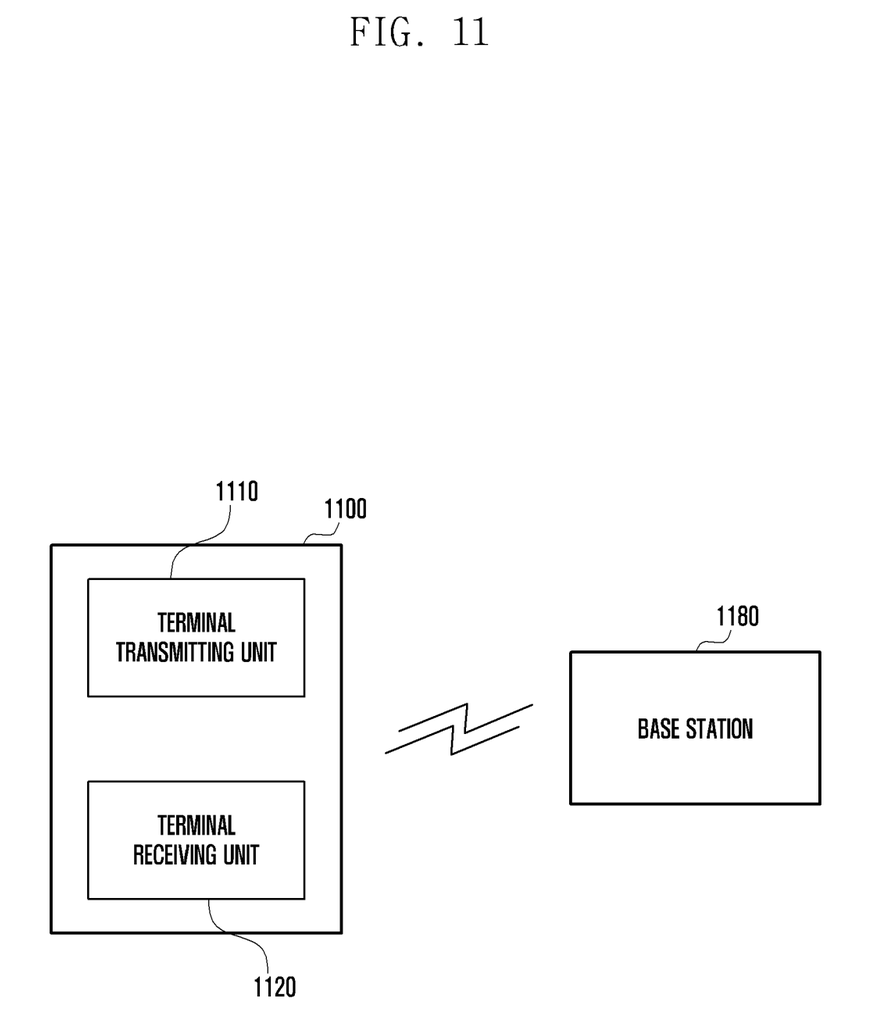
FIG. 11 illustrates a block diagram of a terminal in a wireless communication system according to an embodiment of the disclosure.

FIG. 11 illustrates a block diagram of a terminal in a wireless communication system according to an embodiment of the disclosure.

A terminal 1100 according to the disclosure includes: a terminal transmitting unit 1110 configured to transmit at least one subframe to a base station 1180; and a terminal receiving unit 1120 configured to receive a signal transmitted by the base station 1180, based on a demodulated signal obtained by combining a pre-configured number of subframes including the same consecutive data from the transmitted subframe.

The combining of the subframes may be performed by combining subframes in a time transmission interval (TTI) group, based on an estimated channel of each subframe in the TTI group through which subframes including the same consecutive data are received, determined based on a communication scheme between the base station 1180 and the terminal 1100.

The TTI group may be determined to include four TTIs if a communication scheme between the base station 1180 and the terminal 1100 is frequency division duplex (FDD), and may be determined to include five TTIs if a communication scheme between the base station 1180 and the terminal 1100 is time division duplex (TDD).

A channel of each subframe in the TTI group may be estimated by a weight or window of a channel of each subframe, configured based on a signal-to-noise ratio of a channel of each subframe received in a pre-configured interval.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiment 1, embodiment 2, and embodiment 3 of the disclosure are combined so as to employ a base station and a terminal. In addition, the above embodiments are presented based on an LTE system, but other modifications based on the technical spirit of the embodiment can be implemented in other systems such as a 5G or NR system or the like.

The invention claimed is:

1. A method for signal demodulation by a base station in a wireless communication system, the method comprising:
    receiving at least one subframe through at least one antenna from a terminal by a base station;
    determining a time transmission interval (TTI) group through which subframes comprising identical consecutive data are received, based on a communication scheme between the base station and the terminal;
    estimating a channel of each subframe in the TTI group;
    combining the subframes in the TTI group, based on the estimated channel of each subframe; and
    demodulating received subframes, based on the combined subframes.

2. The method of claim 1, wherein the determining of the TTI group comprises:
    determining, by the base station, four TTIs as a TTI group in a case where the communication scheme between the base station and the terminal is frequency division duplex (FDD); and
    determining, by the base station, five TTIs as a TTI group in a case where the communication scheme between the base station and the terminal is time division duplex (TDD).

3. The method of claim 1, wherein the estimating of the channel comprises:
estimating a channel of each subframe received in a pre-configured interval, by the base station;
configuring a weight or window of a channel of each subframe received in the pre-configured interval, based on a signal-to-noise ratio (SNR) of a channel of each subframe in the pre-configured interval; and
estimating a channel of each subframe in the TTI group, based on a weight or window of a channel of each subframe received in the pre-configured interval,
wherein the pre-configured interval is determined by $$X=N_R*Z*N_{hop},$$

wherein X indicates a pre-configured interval, NR indicates the number of the at least one antenna, Z indicates a TTI group, and $N_{hop}$ indicates the number of TTI groups allocated in an identical band.

4. The method of claim 1, wherein the combining of the subframes comprises:
comparing the number of subframes in the TTI group and a maximum number of subframes combinable by a combiner; and
combining the subframes in the TTI group by one combiner in a case where the number of subframes is equal to or less than the maximum number of combinable subframes.

5. The method of claim 1, wherein the combining of the subframes comprises:
comparing the number of subframes in the TTI group and the maximum number of subframes combinable by a combiner;
determining the number of necessary combiners by the base station, based on the number of subframes and the maximum number of combinable subframes in a case where the number of subframes exceeds the maximum number of combinable subframes;
combining the subframes in the TTI group by a plurality of combiners determined by the base station; and
combining, by the base station, result values obtained by the combining by the plurality of combiners, based on a log likelihood ratio (LLR).

6. A base station in a wireless communication system, the base station comprising:
a base station antenna configured to receive at least one subframe from a terminal;
a processor configured to determine a TTI group through which subframes comprising identical consecutive data are received, based on a communication scheme between the base station and the terminal;
a base station channel estimator configured to estimate a channel of each subframe in the TTI group;
a base station combiner configured to combine the subframes in the TTI group, based on a channel of each subframe; and
a base station demodulator configured to demodulate the received subframes, based on the combined subframes.

7. The base station of claim 6,
wherein, to estimate the channel of each subframe in the TTI group, the base station channel estimator is configured to:
estimate a channel of each subframe received in a pre-configured interval by the base station antenna,
configure a weight or window of a channel of each subframe received in the pre-configured interval, based on a signal-to-noise ratio (SNR) of a channel of each subframe received in the pre-configured interval, and
estimate a channel of each subframe in the TTI group, based on a weight or window of a channel of each subframe received in the TTI group, and
wherein the pre-configured interval is determined by $$X=N_R*Z*N_{hop},$$

wherein X indicates a pre-configured interval, $N_R$ indicates the number of antennas in the base station antenna, Z indicates a TTI group, and $N_{hop}$ indicates the number of TTI groups allocated in identical band.

8. A method for signal reception by a terminal in a wireless communication system, the method comprising:
transmitting at least one subframe to a base station by a terminal; and
receiving a signal transmitted by the base station, based on a demodulated subframe obtained by combining a pre-configured number of subframes comprising identical consecutive data from the transmitted subframe,
wherein the combining of the subframes comprises combining subframes in a time transmission interval (TTI) group, based on an estimated channel of each subframe in the TTI group through which subframes comprising identical consecutive data are received, determined based on a communication scheme between the base station and the terminal.

9. The method of claim 8, wherein the TTI group is determined to include four TTIs in a case where the communication scheme between the base station and the terminal is frequency division duplex (FDD), and is determined to include five TTIs in a case where the communication scheme between the base station and the terminal is time division duplex (TDD).

10. The method of claim 8, wherein the channel of each subframe in the TTI group is estimated by a weight or window of a channel of each subframe, configured based on a signal-to-noise ratio of a channel of each subframe received in a pre-configured interval.

11. A terminal in a wireless communication system, the terminal comprising:
a transmitter configured to transmit at least one subframe to a base station; and
a receiver configured to receive a signal transmitted by the base station, based on a demodulated signal obtained by combining a pre-configured number of subframes comprising identical consecutive data from the transmitted subframe,
wherein the combining of the subframes comprises combining the subframes in a time transmission interval (TTI) group, based on an estimated channel of each subframe in the TTI group through which subframes comprising identical consecutive data are received, determined based on a communication scheme between the base station and the terminal.

12. The terminal of claim 11,
wherein the channel of each subframe in the TTI group is estimated by a weight or window of a channel of each subframe, configured based on a signal-to-noise ratio of a channel of each subframe received in a pre-configured interval.

* * * * *